(12) United States Patent  
Schupbach

(10) Patent No.: US 8,191,924 B2  
(45) Date of Patent: Jun. 5, 2012

(54) DASHBOARD

(75) Inventor: Thierry Schupbach, Meru (FR)

(73) Assignee: Faurecia Interieur Industrie, Nanterre (FR)

( * ) Notice: Subject to any disclaimer, the term of this patent is extended or adjusted under 35 U.S.C. 154(b) by 171 days.

(21) Appl. No.: 12/738,863

(22) PCT Filed: Dec. 19, 2008

(86) PCT No.: PCT/FR2008/001804  
§ 371 (c)(1),  
(2), (4) Date: Apr. 20, 2010

(87) PCT Pub. No.: WO2009/103906  
PCT Pub. Date: Aug. 27, 2009

(65) Prior Publication Data  
US 2010/0213691 A1    Aug. 26, 2010

(30) Foreign Application Priority Data  
Dec. 21, 2007    (FR) ..................... 07 60246

(51) Int. Cl.  
*B60R 21/205*    (2006.01)  
*B60R 21/215*    (2006.01)

(52) U.S. Cl. ..................... 280/728.3; 280/732

(58) Field of Classification Search ............... 280/728.3, 280/732; 296/70  
See application file for complete search history.

(56) References Cited

U.S. PATENT DOCUMENTS

| | | | | |
|---|---|---|---|---|
| 5,292,151 A * | 3/1994 | Parker | ................. | 280/728.3 |
| 5,316,334 A * | 5/1994 | Skidmore | ................. | 280/728.3 |
| 5,320,381 A * | 6/1994 | Barnes et al. | ............ | 280/728.3 |
| 5,350,191 A | 9/1994 | Kokeguchi et al. | | |
| 5,375,876 A * | 12/1994 | Bauer et al. | ................. | 280/728.3 |
| 5,423,571 A * | 6/1995 | Hawthorn | ................. | 280/738 |
| 6,390,497 B1 * | 5/2002 | Shin | ........................ | 280/728.3 |
| 7,055,850 B2 | 6/2006 | Freystedt | | |
| 7,367,587 B2 * | 5/2008 | Taoka | ..................... | 280/751 |
| 7,594,674 B1 * | 9/2009 | Biondo et al. | ............ | 280/728.3 |
| 2005/0167955 A1* | 8/2005 | Gayer et al. | ............... | 280/728.3 |
| 2007/0145728 A1* | 6/2007 | Sadano et al. | ............... | 280/732 |

FOREIGN PATENT DOCUMENTS

| | | |
|---|---|---|
| DE | 10 2004 058 826 | 6/2006 |
| EP | 0 517 414 | 12/1992 |
| EP | 1 348 601 | 10/2003 |
| FR | 2925000 A1 * | 6/2009 |

OTHER PUBLICATIONS

International Search Report dated Jul. 22, 2009, from corresponding PCT application.

* cited by examiner

*Primary Examiner* — Joseph Rocca  
*Assistant Examiner* — James English  
(74) *Attorney, Agent, or Firm* — Young & Thompson

(57) ABSTRACT

The invention relates to a dashboard (1) for an automobile, of the type that comprises a lower-resistance line defining a flap (4) to be opened under the pressure generated by the expansion of an airbag (10) upon an impact to the automobile, said flap including a wall (18) having an inner surface (24) on the side of a housing (8) containing the airbag, and an outer surface (26) opposite the inner surface, characterized in that it comprises a pattern (6) with which the flap is brought into contact upon the opening thereof, and in that the wall of the flap includes at least one breaking primer (40) located in the vicinity of a contact point (P) between the flap and the pattern, for breaking the wall into several parts.

20 Claims, 2 Drawing Sheets

DASHBOARD

The present invention relates to a dashboard for a motor vehicle, of the type comprising a line of less resistance which delimits a flap which is intended to open under the pressure of the deployment of a safety airbag when the motor vehicle is subjected to an impact, the flap comprising a wall which has an inner face at the side of the safety airbag and an outer face opposite the inner face.

For some time, it has been desirable to provide dashboards with various shapes for substantially aesthetic reasons. However, these shapes have the disadvantage of having reliefs which impede the flap when it opens under the action of the actuation of the safety airbag. The flap rebounds on the relief. The hinge element which couples the flap to the dashboard is torn away and the flap becomes separated from the dashboard. Furthermore, when striking the relief, the flap breaks into pieces. Finally, the relief itself is damaged: not only may it be damaged in an irreversible manner necessitating the whole of the dashboard to be replaced, but it can also be broken and project pieces into the passenger space at the time of impact.

The object of the invention is to provide a dashboard which, although it comprises such reliefs, does not have the above-mentioned problems and improves the safety of the vehicle.

To this end, the invention relates to a dashboard of the above-mentioned type, characterised in that it comprises a relief with which the flap comes into contact when it opens, and in that the wall of the flap comprises at least one break starting point which is located in the region of a contact point between the flap and the relief and which allows the wall to be broken into several pieces.

According to specific embodiments, the dashboard comprises one or more of the following features, taken in isolation or according to any technically possible combination:
- the wall of the flap is of a rigid material, such as a rigid plastic,
- the starting point is a zone of reduced thickness of the wall of the flap,
- the starting point is a groove which is located on the inner face of the wall of the flap,
- the groove has a V-like cross-section,
- the flap comprises a skin which covers the outer face of the wall and which is fixedly joined thereto, and the skin is capable of retaining the pieces of the wall of the broken flap,
- the skin is of flexible material, such as a flexible plastic,
- the flap comprises a reinforcement plate which is fixed against the inner face of the wall,
- the reinforcement plate is of a flexible material, such as a rubber material.

The invention also relates to a motor vehicle comprising a dashboard and a casing comprising an airbag, characterised in that the dashboard is a dashboard as defined above.

The invention and the advantages thereof will be better understood from the reading of the following description, given purely by way of example and with reference to the appended drawings, in which:

FIG. 1 illustrates a cross-section of the dashboard along a vertical plane parallel with the longitudinal axis of the vehicle. The dashboard 1 is located above a dashboard cross-member 2 which extends over the width of the motor vehicle.

Figure 1:
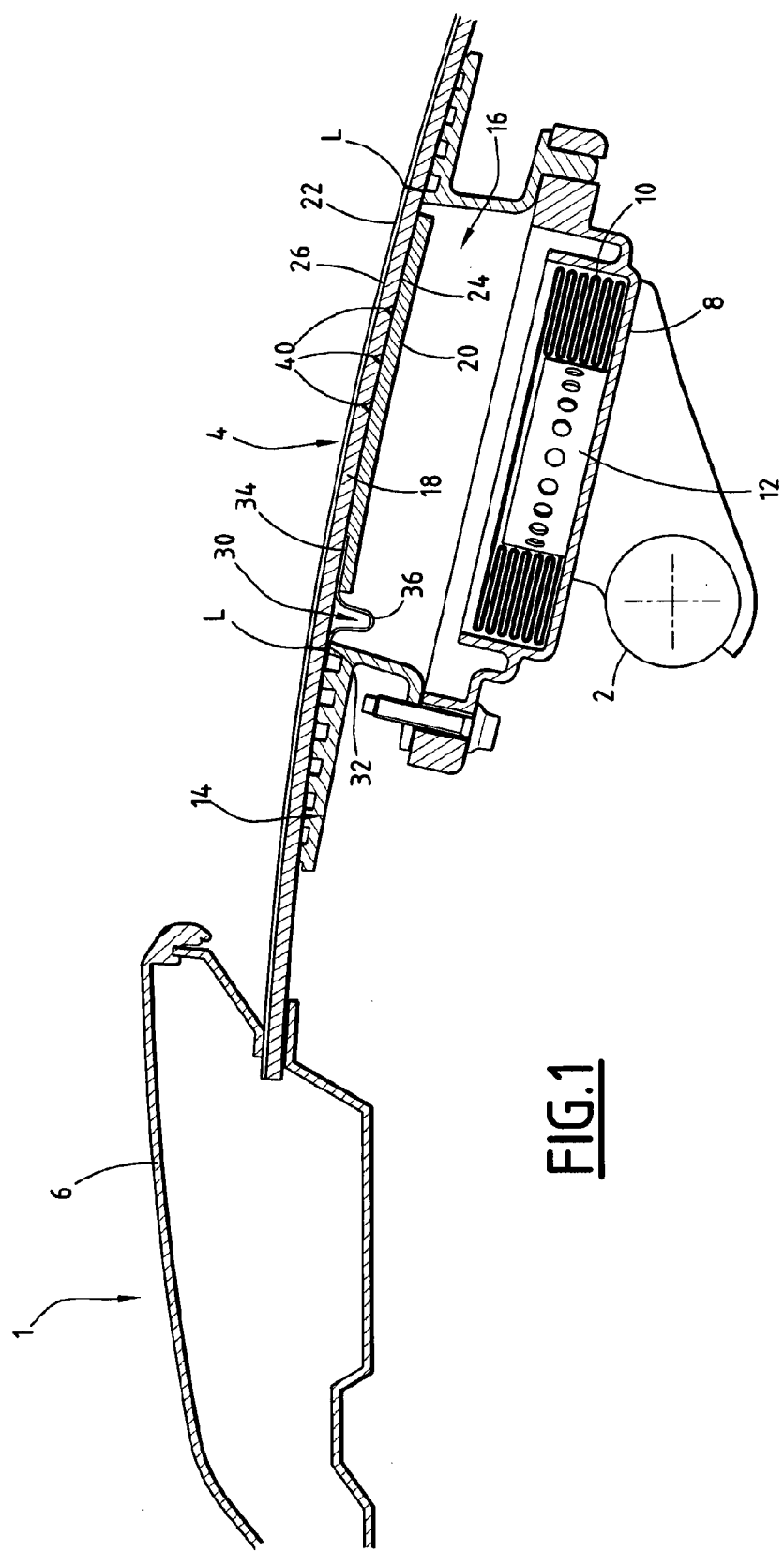
FIG. 1 is a cross-section of a dashboard according to the invention, the flap being in the closed position.
Figure 2:
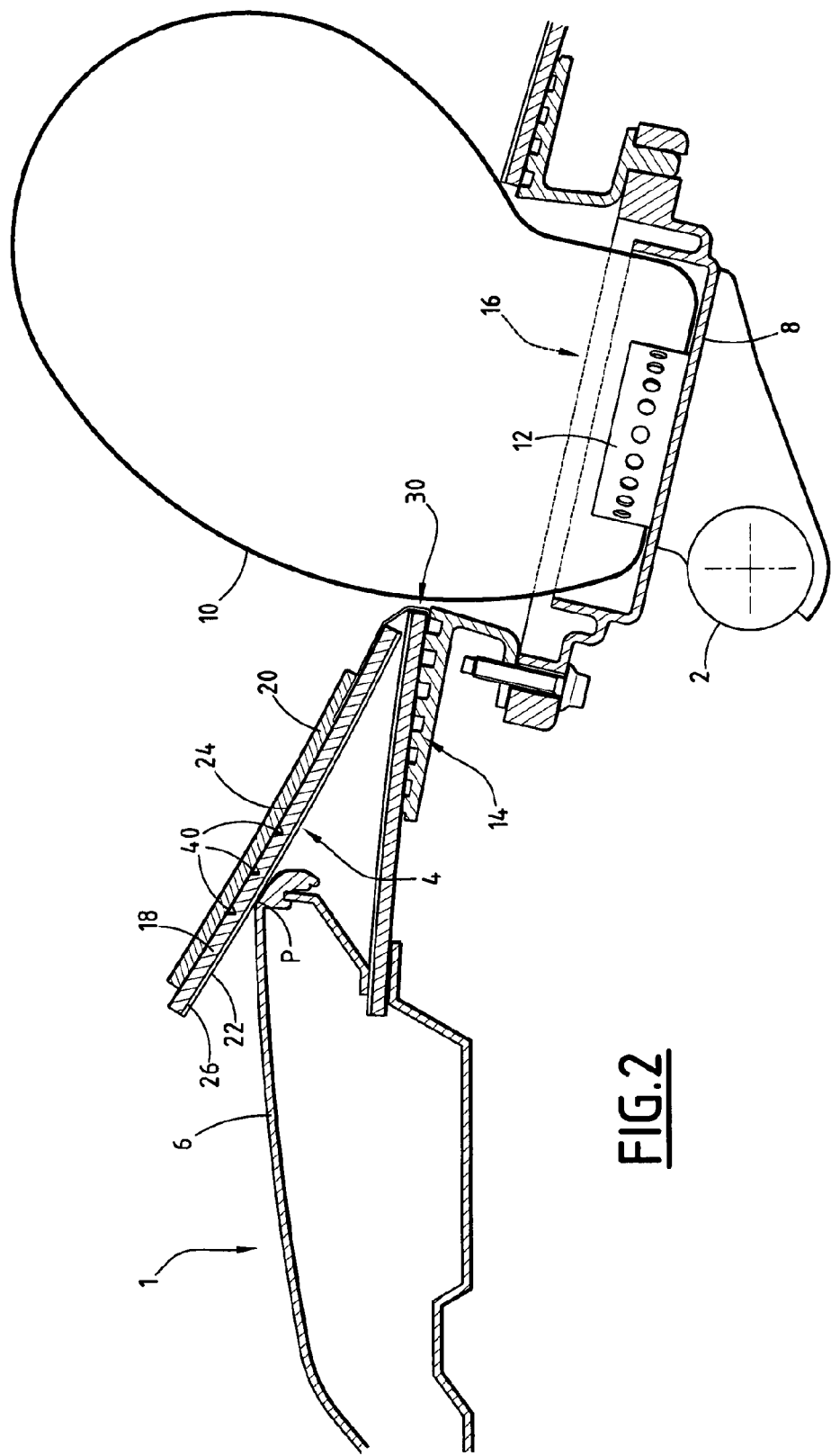
FIG. 2 illustrates again the cross-section of FIG. 1, the flap in this instance being in an open position and coming into contact with a relief of the dashboard.

The dashboard 1 comprises a flap 4 and a portion which forms a relief 6 in the region of the flap 4.

On the cross-member 2, substantially opposite the passenger seat, a casing 8 is fixed to the cross-member 2. The casing 8 comprises an airbag 10 and means 12 which allow the airbag 10 to be inflated when it is activated in the event of an impact between an external obstacle and the motor vehicle.

The casing 8 is also fixed to the lower face of the dashboard by means of a support frame 14. The support frame 14 defines a channel 16 which allows the airbag 10 to be guided as it is inflated. This channel 16 is blocked by the flap 4 of the dashboard 1.

The flap 4 is simply delimited in the dashboard 1 with a dotted line of less resistance L. The flap 4 comprises a wall 18, a lower reinforcement plate 20 and an upper skin 22.

The wall 18 is of a rigid plastic, which is that of the dashboard 1. On the inner face 24 thereof directed towards the casing 8, the reinforcement plate 20 is fixed.

This reinforcement plate 20 is of a material which has a degree of flexibility, such as a synthetic rubber EPDM ("Ethylene Propylene Diene Monomer"). The reinforcement plate 20 is welded to the inner face 24, for example, by means of ultrasound.

The skin 22 covers and is fixedly joined to an outer face 26 of the wall 10, opposite the inner face 24. The skin 22 which extends over the regions of the dashboard 1 adjacent to the flap 4 and which advantageously covers the majority, or even all, of the surface of the dashboard 1 is a sheet of a flexible plastic, for example, a polyolefin (TPO).

The substantially rectangular flap 4 is articulated along one of the edges 28 thereof to the remainder of the dashboard 1 by means of a hinged connection which is produced by a net 30 of plastic.

The net 30 has an edge 32 which is clamped between the dashboard 1 and the frame 14 along the side of the line L adjacent to the relief 6, an edge 34 which is clamped between the inner face 24 of the wall 18 and the reinforcement plate 20, and a free loop 36 between the edges 32 and 34.

The inner face 24 of the wall 18 is provided with a plurality of break starting points 40 which are in the shape of grooves with a V-like profile.

Under the pressure applied by the safety airbag 10 when it is activated, the flap 4 opens and rotates about the hinged connection 30 in order to release the channel 16 of the frame 14 and allow the airbag 10 to inflate. When it is opened, the rotation movement of the flap 4 continues until the flap 4 comes into contact with the relief 6 of the dashboard 1. This contact is carried out in the region of a point P.

Under the action of the localised impact of the relief 6 on the outer face 26 of the wall 18, the wall breaks into several pieces around the break starting points 40.

The various parts of the broken wall 18 are held together by the skin 22 and/or the reinforcement plate 20 which are of flexible and deformable materials.

It should be noted that the airbag 10 opens the flap 4 by pressing on the reinforcement plate 20. In this manner, the pressure is distributed over the entire inner face 24 of the flap 4. The wall 18 therefore does not break in the region of the starting points 40 under the action of the airbag 10.

It has been found that, in order for the break starting points 40 to completely perform their function, they must be located in the region of the contact point P of the flap 4 with the relief 6. The person skilled in the art will know how to arrange these starting points in accordance with the specific shape of the relief 6 and the mechanical properties of the various components, in particular the rigid wall 18.

A part of the kinetic energy of the flap 4 acquired as it opens is dissipated in the form of a breaking energy which allows the wall 18 to be broken. In this manner, the residual kinetic energy of the flap 4 is reduced. The impact between the flap 4 and the relief 6 is carried out in a less explosive manner. Consequently, the risk that the flap 4 will be broken away from the rest of the dashboard 1 along the hinge 30 and a piece from the flap 4 or relief 6 may be projected into the passenger space of the motor vehicle is significantly reduced.

The invention claimed is:

1. A dashboard (1) for a motor vehicle, comprising:
    a line (L) of less resistance which delimits a flap (4) intended to open under the pressure of deployment of a safety airbag (10) when the motor vehicle is subjected to an impact,
    the flap comprising a wall (18) having an inner face (24) at the side of a casing (8) which comprises the airbag and an outer face (26) opposite the inner face, and
    a relief (6) with which the flap comes into contact, when during opening of the flap, in order to create a localized impact on the outer face (26) of the wall (18),
    wherein the flap comprises at least one break starting point (40) located in the region of a contact point (P) between the flap and the relief, the break starting point facilitating the wall to be broken into several pieces, the breaking of the wall being under effect of localized impact of the wall against the relief by transforming a part of kinetic energy of the wall into a breaking energy of the wall thereby limiting effects of rebound on the relief.

2. The dashboard according to claim 1, wherein the wall (18) of the flap (4) is of a rigid material.

3. The dashboard according to claim 1, wherein the starting point (40) is a zone of reduced thickness of the wall (18) of the flap (4).

4. The dashboard according to claim 1, wherein the starting point is a groove (40) which is located on the inner face (24) of the wall (18) of the flap (4).

5. The dashboard according to claim 4, wherein the groove (40) has a V-like cross-section.

6. The dashboard according to claim 1, wherein the flap (4) comprises a skin (22) which covers the outer face (26) of the wall (18) and which is fixedly joined thereto, and in that the skin is capable of retaining the pieces of the wall of the broken flap.

7. The dashboard according to claim 6, wherein the skin (22) is of flexible material.

8. The dashboard according to claim 1, wherein the flap (4) comprises a reinforcement plate (20) which is fixed against the inner face (26) of the wall (18).

9. The dashboard according to claim 8, wherein the reinforcement plate (20) is of a flexible material.

10. A motor vehicle comprising a dashboard and a casing (8) comprising an airbag (10), characterised in that the dashboard (1) is a dashboard according to claim 1.

11. The dashboard according to claim 2, wherein the starting point (40) is a zone of reduced thickness of the wall (18) of the flap (4).

12. The dashboard according to claim 2, wherein the starting point is a groove (40) which is located on the inner face (24) of the wall (18) of the flap (4).

13. The dashboard according to claim 3, wherein the starting point is a groove (40) which is located on the inner face (24) of the wall (18) of the flap (4).

14. The dashboard according to claim 1, wherein the wall (18) of the flap (4) is of a rigid plastic.

15. The dashboard according to claim 6, wherein the skin (22) is of flexible plastic.

16. The dashboard according to claim 8, wherein the reinforcement plate (20) is of a rubber material.

17. A dashboard (1) for a motor vehicle, comprising:
    a casing (8) fixed to a cross-member (2) of the vehicle, the cross-member (2) extending over the motor vehicle's width, the casing comprising a safety airbag (10);
    a flap (4), the flap (4) configured to open under pressure of deployment of the safety airbag (10) when the motor vehicle is subjected to an impact, the flap delimitted by a line of less resistance (L);
    a connection (30) at a edge (28) of the flap (4), the flap (4) articulated along the edge (28) by the connection (30);
    a relief (6) with a contact point (P) positioned to come into contact with a portion of the flap (4) upon opening and rotation of the flap (4);
    a wall (18) within the flap (4), the wall comprising i) an inner face (24) at a side of the casing (8) comprising the airbag and ii) an outer face (26) opposite the inner face; and
    a plurality of break starting points (40) provided on the inner face (24) of the wall, wherein,
    under the pressure of deployment of the safety airbag (10), the flap (4) opens and rotates about the connection (30) in order to allow the airbag (10) to inflate, rotational movement of the flap (4) continuing until an area of the flap (4) defined by the break starting points (40) comes into contact with the relief (6) in a region of the contact point (P) so that under action of localized impact of the relief (6) on the outer face (26) of the wall (18), the wall breaks into plural pieces around the break starting points (40), a part of the kinetic energy of the flap (4) during opening is dissipated as a breaking energy of the wall (18) thereby reducing residual kinetic energy of the flap (4) so as to reduce impact between the flap (4) and the relief (6) and reduce risk of breaking the flap (4) along the connection (30).

18. The dashboard of claim 17, further comprising:
    a reinforcement plate (20) fixed on the inner face (24) of the wall (18),
    wherein, the airbag (10) opens the flap (4) by pressing on the reinforcement plate (20) so that the pressure is distributed over the entire inner face (24) of the flap (4) and so that the wall (18) does not break in the region of the starting points (40) under the action of the airbag (10) opening the flap (4),
    wherein the break starting points define plural grooves (40).

19. A dashboard (1) for a motor vehicle having a safety airbag (10), the dashboard comprising:
    a flap (4) configured to open under pressure of deployment of the safety airbag (10);
    a connection (30) at a edge (28) of the flap (4);
    a relief (6) with a contact point (P) positioned to come into contact with a portion of the flap (4) upon rotation of the flap (4);
    a wall (18) within the flap, the wall comprising an inner face (24) and an outer face (26); and
    a plurality of break starting points (40) provided on the inner face (24) of the wall, wherein,
    under the pressure of deployment of the safety airbag (10), the flap (4) opens and rotates about the connection (30) with rotational movement of the flap (4) continuing until an area of the flap (4) defined by the break starting points (40) come into contact with the relief (6) in a region of a contact point (P) so that under action of localized impact of the relief (6) on the outer face (26) of the wall (18), the wall breaks into plural pieces around the break starting points (40), a part of the kinetic energy of the flap (4) during opening is dissipated as a breaking energy of the wall (18).

20. The dashboard of claim 19, further comprising:

a reinforcement plate (20) fixed on the inner face (24) of the wall (18), wherein, the airbag (10) opens the flap (4) by pressing on the reinforcement plate (20) so that the pressure is distributed over the entire inner face (24) of the flap (4) and so that the wall (18) does not break in the region of the starting points (40) under the action of the airbag (10) opening the flap (4), wherein the break starting points define plural grooves (40).

\* \* \* \* \*